(12) United States Patent
Lai et al.

(10) Patent No.: US 10,996,442 B2
(45) Date of Patent: May 4, 2021

(54) LENS ASSEMBLY AND FABRICATION METHOD THEREOF

(71) Applicant: Rays Optics Inc., Hsinchu County (TW)

(72) Inventors: Sheng-Tang Lai, Hsinchu (TW); Ching-Sheng Chang, Taichung (TW); Hsin-Te Chen, Yilan County (TW); Kuo-Chuan Wang, Miaoli County (TW)

(73) Assignee: Rays Optics Inc., Hsinchu County (TW)

( * ) Notice: Subject to any disclaimer, the term of this patent is extended or adjusted under 35 U.S.C. 154(b) by 243 days.

(21) Appl. No.: 16/232,054

(22) Filed: Dec. 26, 2018

(65) Prior Publication Data

US 2020/0081229 A1    Mar. 12, 2020

(30) Foreign Application Priority Data

Sep. 12, 2018  (TW) .................... 10713214.2

(51) Int. Cl.
*G02B 13/00* (2006.01)
*G02B 9/62* (2006.01)
*G02B 9/60* (2006.01)

(52) U.S. Cl.
CPC .......... *G02B 13/0045* (2013.01); *G02B 9/60* (2013.01); *G02B 9/62* (2013.01)

(58) Field of Classification Search
CPC ......... G02B 13/0045; G02B 9/62; G02B 9/60
See application file for complete search history.

(56) References Cited

U.S. PATENT DOCUMENTS

| | | | |
|---|---|---|---|
| 8,134,787 B2 | 3/2012 | Saitoh | |
| 10,641,993 B1* | 5/2020 | Ning | ................ G02B 9/62 |
| 2016/0320613 A1* | 11/2016 | Emi | .............. G02B 13/006 |

FOREIGN PATENT DOCUMENTS

TW    I615628 B    2/2018

OTHER PUBLICATIONS

Kasarova et al. "Temperature dependence of refractive characteristics of optical plastics" 2010 J. Phys.: Conf. Ser. 253 012028, pp. 1-6 (Year: 2010).*

\* cited by examiner

*Primary Examiner* — Cara E Rakowski

(57) ABSTRACT

A lens assembly including a first lens, a second lens, a third lens, a fourth lens, and a fifth lens, arranged from the magnification side to the reduction side, is provided. The fourth lens and the fifth lens are combined into a cemented lens having an aspherical surface. The lens assembly includes 5 to 6 lenses with a refractive power. The first lens is a glass lens, and the others are aspherical lenses. R1 is the radius of curvature of the lens surface of the first lens facing the magnification side, R2 is the radius of curvature of the lens surface of the first lens facing the reduction side, T is the thickness, on the optical axis of the lens assembly, of the first lens, wherein the refractive index of the first lens>1.55, the Abbe number of the first lens>55, and R1-R2-T<8.8.

20 Claims, 16 Drawing Sheets

LENS ASSEMBLY AND FABRICATION METHOD THEREOF

This application claims the benefit of Taiwan application Serial No. 107132142, filed Sep. 12, 2018, the subject matter of which is incorporated herein by reference.

BACKGROUND OF THE INVENTION

Field of the Invention

The invention relates in general to a lens assembly and a fabrication method thereof.

Description of the Related Art

Along with the advance in technology over recent years, the lens assembly is getting more diversified. The lens assembly used in vehicles is a commonly see lens assembly. As the requirements of thinness and optical properties are getting higher and higher, the lens assembly satisfying above requirements must possess the features of low cost, high resolution, large aperture, wide view-angle, low thermal drift and light weight. Therefore, it has become a prominent task for the industries to provide a lens assembly possessing the features of light weight, lower manufacturing cost and better optical quality.

The contents disclosed in the related art and the problems that one or more than one embodiment of the present invention aims to resolve are not necessarily known to or acknowledged by anyone ordinarily skilled in the technology field of the present invention before the application of the present invention is filed.

SUMMARY OF THE INVENTION

Other objects and advantages of the present invention can be understood from the technical features disclosed in the embodiments of the present invention embodiment.

According to one embodiment of the invention, a lens assembly including a first lens, a second lens, a third lens, a fourth lens, a fifth lens, and an aperture is provided. The first lens, the second lens, the third lens, the fourth lens, and the fifth lens are arranged from the magnification side to the reduction side. The first lens is a glass lens. The fourth lens and the fifth lens are combined into a cemented lens having a cemented surface, wherein the cemented surface is an aspherical surface. The aperture is located between the second lens and the fourth lens. The lens assembly includes 5 to 6 lenses with a refractive power. The lens assembly satisfies the following conditions: the dN/dT of the third lens $>-100\times10^{-6}$, and the dN/dT of the fourth lens $<-120\times10^{-6}$, wherein dN is the difference between refractive indexes of light with a wavelength of 587 nm passing the lens at 40° C. and 20° C., and dT is the difference between 40° C. and 20° C., that is, 20. Through the properties of the materials of the third and the fourth lenses and the design of the lens assembly being formed of two lens groups and including 5 to 6 lenses, the lens assembly advantageously possesses the features of light weight, lower manufacturing cost, wide view-angle, low thermal drift and better optical quality.

According to another embodiment of the invention, a lens assembly includes a first lens, a second lens, a third lens, a fourth lens, and a fifth lens, arranged from the magnification side to the reduction side, is provided. The fourth lens and the fifth lens are combined into a cemented lens having a cemented surface, wherein the cemented surface is an aspherical surface. The lens assembly includes 5 to 6 lenses with a refractive power. The first lens is a glass lens, and the others are aspherical lenses. R1 is the radius of curvature of the lens surface of the first lens facing the magnification side, R2 is the radius of curvature of the lens surface of the first lens facing the reduction side, T is the thickness, on the optical axis of the lens assembly, of the first lens, wherein the lens assembly satisfies the following conditions: the refractive index of the first lens>1.55, the Abbe number of the first lens>55, R1-R2-T<8.8. Through the design of the lens assembly including spherical lens, cemented aspherical lens and aspherical lens and the number of the lenses ranging between 5 to 6, the lens assembly advantageously possesses the features of light weight, lower manufacturing cost, wide view-angle, low thermal drift and better optical quality.

Through the design disclosed in the embodiments of the present invention, an optical lens which possesses the features of light weight, lower manufacturing cost and better optical quality and can be used in application fields such as vehicles, security and access control is provided. Based on the design that the lens assembly includes 5 to 6 lenses and the length (TTL) from the lens assembly to the sensor is less than 16.5 mm, the lens assembly advantageously possesses the features of larger aperture, higher resolution, lighter weight, wider view angle, and low thermal drift, the manufacturing cost can be reduced and the optical quality can be improved.

The above and other aspects of the invention will become better understood with regard to the following detailed description of the preferred but non-limiting embodiment (s). The following description is made with reference to the accompanying drawings.

DETAILED DESCRIPTION OF THE INVENTION

The technical contents, features, and effects of the present invention are disclosed below in a number of embodiments with accompanying drawings. Moreover, ordinal numbers, such as "the first" and "the second", are used in the following embodiments to clearly distinguish the elements having the same designations, not for limiting the said element.

When the lens assembly is used in an image system, the image magnification side refers to the side of the lens assembly closer to the object to be shot on the optical path, and the image reduction side refers to the side of the lens assembly closer to the light sensing element on the optical path.

Figure 1:
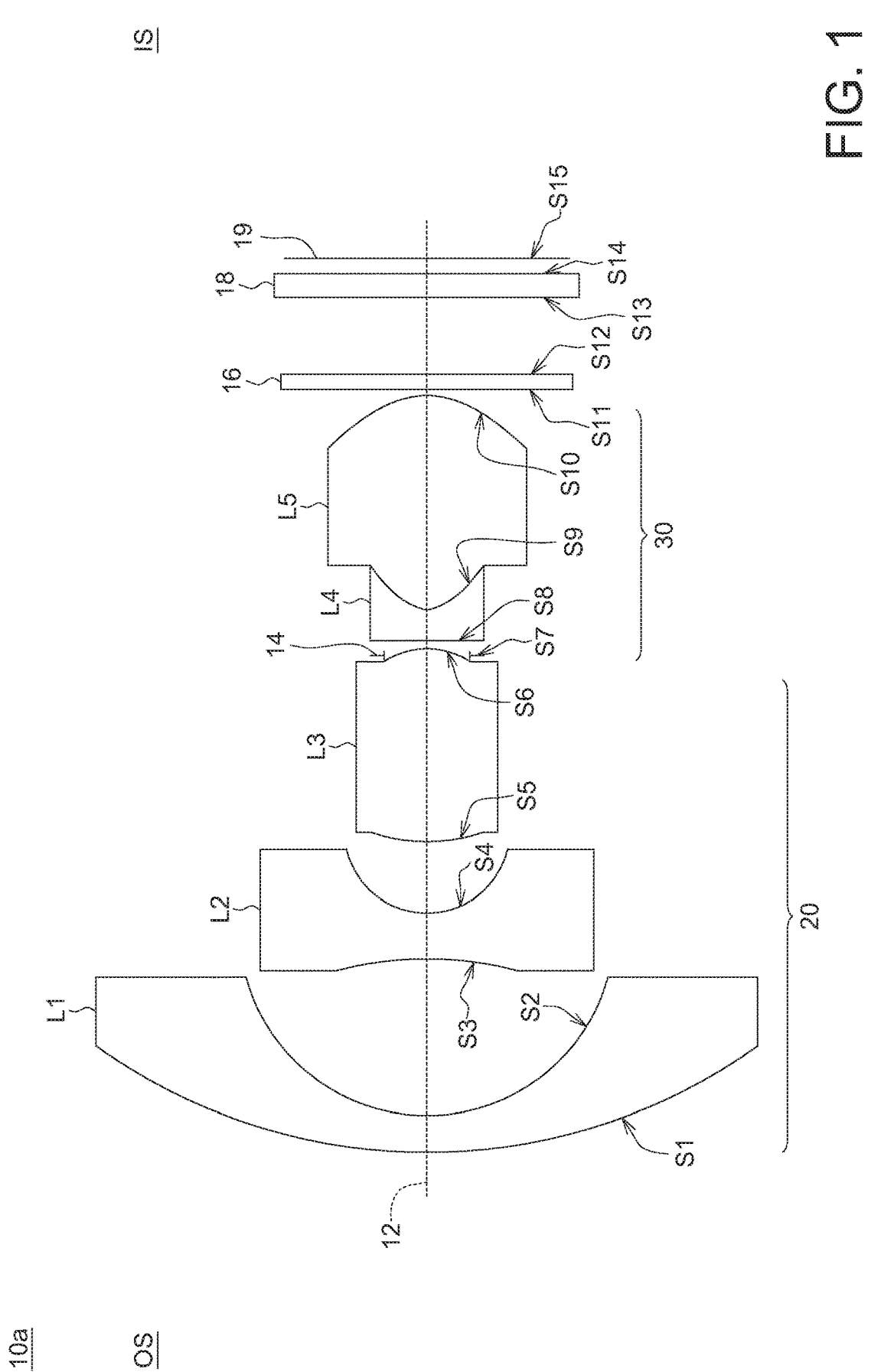
FIG. 1 is a schematic diagram of a lens assembly 10*a* according to a first embodiment of the present invention.

FIG. 1 is a schematic diagram of a lens assembly 10a according to a first embodiment of the present invention. Refer to FIG. 1. In the present embodiment, the lens assembly 10a includes a lens barrel (not illustrated), within which a first lens L1, a second lens L2, a third lens L3, an aperture 14, a fourth lens L4 and a fifth lens L5 are arranged from the first side (the image magnification side OS) to the second side (the image reduction side IS). The first lens L1, the second lens L2 and the third lens L3 form a first lens group 20 (such as the front group) with a positive refractive power. The fourth lens L4 and the fifth lens L5 form a second lens group 30 (such as the rear group) with a positive refractive power. Moreover, an IR filter 16, a cover glass 18 and an image sensor (not illustrated) are disposed on the image reduction side IS. The imaging plane of the lens assembly 10a at the effective focal length of visible light is designated by 19. The IR filter 16 and the cover glass 18 are disposed between the second lens group 30 and the imaging plane 19. In the present embodiment, the refractive powers of the first lens L1 to the fifth lens L5 sequentially are negative (−), negative, positive (+), negative, positive, and the second lens L2, the third lens L3, the fourth lens L4 and the fifth lens L5 are aspherical plastic lens. In an embodiment, aspherical plastic lenses can be replaced by aspherical glass lenses. Additionally, the lenses whose adjacent surfaces have substantially identical radius of curvature (the difference in the radius of curvature<0.005 mm) or completely identical radius of curvature can form a combined lens, a cemented lens, a doublet lens or a triplet lens. In the present embodiment, the fourth lens L4 and the fifth lens L5 form a cemented lens, but the embodiments of the present invention are not limited thereto. In the embodiments of the present invention, the image magnification side OS is located at the left-hand side and the image reduction side IS is located at the right-hand side, and the similarities are not repeated here.

In the present invention, the aperture 14 is an aperture stop. The aperture is an independent element or is integrated in other optical elements. In the present embodiment, the aperture achieves a similar effect by blocking the light on the peripheral part using a mechanism member but keeping the central part permeable to the light. The said mechanism member can be adjustable, which means the position, shape and transparency of the mechanism member can be adjusted. Or, the aperture can limit the optical path by coating an opaque light absorbing material on the surface of the lens but keeping the central part permeable to the light.

The design parameters, shapes and aspherical coefficients of the lens assembly 10a are listed in Table 1 and Table 2. In a design example of the present invention, the aspherical polynomial can be expressed as:

$$Z = \frac{cr^2}{1 + \sqrt{1 - (1+k)c^2 r^2}} + \sum_{i=1}^{N} \alpha_i r^j \quad (1)$$

In the formula (1), Z represents a sagittal along the direction of the optical axis; c represents a reciprocal of the radius of an osculating sphere, that is, the reciprocal of the radius of curvature close to the optical axis 12 (such as the radius of curvature of surfaces S1-S10 as listed in Table 1); k represents a conic coefficient; r represents an aspherical height, respectively representing the value of aspherical coefficient of each order of the spherical polynomial. However, the data exemplified below are not for limiting the present invention. Any person ordinary skilled in the technology field can make necessary modifications or adjustments to the parameters or setting of the present invention, and the said modifications or adjustments are still within the scope of the present invention.

TABLE 1

F/# = 2.05; TTL = 16.1 (mm); LT = 13.91 (mm)
EFL = 1.125 (mm); FOV = 200.1°; EFL/LT = 0.08

| Surface | Radius of curvature (mm) | Interval (mm) | Refractive power | Abbe number | Element |
|---|---|---|---|---|---|
| S1 | 13.13 | 0.65 | 1.59 | 59.37 | L1 (convex-concave) |
| S2 | 4.05 | 2.84 | | | |
| S3* | −3.62 | 0.88 | 1.55 | 56.09 | L2 (aspherical lens) |
| S4* | 1.74 | 1.33 | | | |
| S5* | 4.07 | 3.53 | 1.65 | 23.27 | L3 (aspherical lens) |
| S6* | −1.94 | −0.17 | | | |
| S7 | INF. | 0.34 | | | Aperture 14 |
| S8* | 14.40 | 0.60 | 1.65 | 22.38 | L4 (aspherical lens) |
| S9* | 0.69 | 3.91 | 1.53 | 55.35 | L5 (aspherical lens) |
| S10* | −3.03 | 0.10 | | | |
| S11 | INF. | 0.30 | 1.52 | 64.17 | IR Filter 16 |
| S12 | INF. | 1.35 | | | |
| S13 | INF. | 0.40 | 1.52 | 64.17 | Cover glass 18 |
| S14 | INF. | 0.05 | | | |
| S15 | INF. | | | | Imaging plane 19 |

TABLE 2

| | S3* | S4* | S5* | S6* | S8* | S9* | S10* |
|---|---|---|---|---|---|---|---|
| k | −40.51 | −0.80 | −5.92 | −6.91 | 81.19 | −1.04 | −0.16 |
| $\alpha_1$ | 0 | 0 | 0 | 0 | 0 | 0 | 0 |
| $\alpha_2$ | 0 | 0 | 0 | 0 | 0 | 0 | −1.05E−01 |
| $\alpha_3$ | 0 | 0 | 0 | 0 | 0 | −4.57E−02 | 2.77E−02 |
| $\alpha_4$ | 4.33E−03 | 6.88E−02 | −9.05E−03 | −4.69E−02 | 2.63E−02 | −1.12E−01 | −7.94E−03 |
| $\alpha_5$ | 0 | 0 | 0 | 0 | 0 | −1.05E−02 | 1.42E−02 |
| $\alpha_6$ | −2.58E−04 | −4.37E−02 | 2.76E−03 | 2.58E−02 | −5.08E−02 | 1.11E−01 | −6.45E−03 |
| $\alpha_7$ | 0 | 0 | 0 | 0 | 0 | −1.55E−02 | −1.24E−03 |
| $\alpha_8$ | 2.21E−06 | 2.39E−02 | −4.69E−04 | −2.61E−02 | 2.34E−02 | −5.75E−02 | 1.39E−03 |
| $\alpha_9$ | 0 | 0 | 0 | 0 | 0 | 5.10E−03 | 1.34E−04 |
| $\alpha_{10}$ | 2.53E−07 | −4.12E−03 | −8.55E−04 | 1.15E−02 | 8.39E−04 | 1.17E−02 | −1.93E−04 |
| $\alpha_{11}$ | 0 | 0 | 0 | 0 | 0 | 1.12E−02 | 7.45E−07 |
| $\alpha_{12}$ | 0 | 0 | 0 | 0 | 0 | −5.97E−05 | 1.16E−06 |

TABLE 2-continued

| | S3* | S4* | S5* | S6* | S8* | S9* | S10* |
|---|---|---|---|---|---|---|---|
| α13 | 0 | 0 | 0 | 0 | 0 | 7.58E−03 | 9.45E−08 |
| α14 | 0 | 0 | 0 | 0 | 0 | −9.92E−03 | 2.78E−07 |

The interval of the surface S1 is the distance on the optical axis 12 from the surface S1 to the surface S2. The interval of the surface S2 is the distance on the optical axis 12 from the surface S2 to the surface S3. The interval of the surface S14 is the distance on the optical axis 12 from the surface S14 to the imaging plane 19 at the effective focal length of visible light.

In the tables, the surface with a * sign is an aspherical surface, and the surface without the * sign is a spherical surface.

The radius of curvature is the reciprocal of the curvature. When the radius of curvature is positive, the sphere center of the lens surface is located at the image reduction side of the lens assembly. When the radius of curvature is negative, the sphere center of the lens surface is located at the image magnification side of the lens assembly. The concavity and convexity of each lens are listed in above tables.

The F-number of the present invention is represented by F/# as indicated in above tables. When the lens of the present invention is used in a projection system, the imaging plane is a light valve surface. When the lens assembly is used in an image system, the imaging plane is the surface of the light sensing element.

In the present invention, the total length of the lens is represented by LT as indicated in above tables. To be more specifically, in the present embodiment, the total length is the distance on the optical axis 12 of the lens assembly 10a from the optical surface S1 closest to the image magnification side to the optical surface S10 closest to the image reduction side. The total length (LT) of the lens is less than 14.5 mm. In the present invention, the total length from the lens assembly to the imaging plane 19 is represented by TTL as indicated in above tables. To be more specifically, in the present embodiment, the total length TTL from the lens assembly to the imaging plane 19 refers to the distance on the optical axis 12 of the lens assembly 10a from the optical surface S1 closest to the image magnification side to the imaging plane 19 of the lens assembly. In the present embodiment, the first lens is formed of glass and is suitable for water-proof, anti-scratch lens assembly used in vehicles, access control or outdoors.

In the present embodiment, full field of view (FOV) is the receiving angle of the optical surface S1 closest to the image magnification end, that is, the field of view measured using the image circle as indicated in above tables. In the embodiments of the present invention, FOV satisfies: 180°<FOV<220°.

Figure 2:
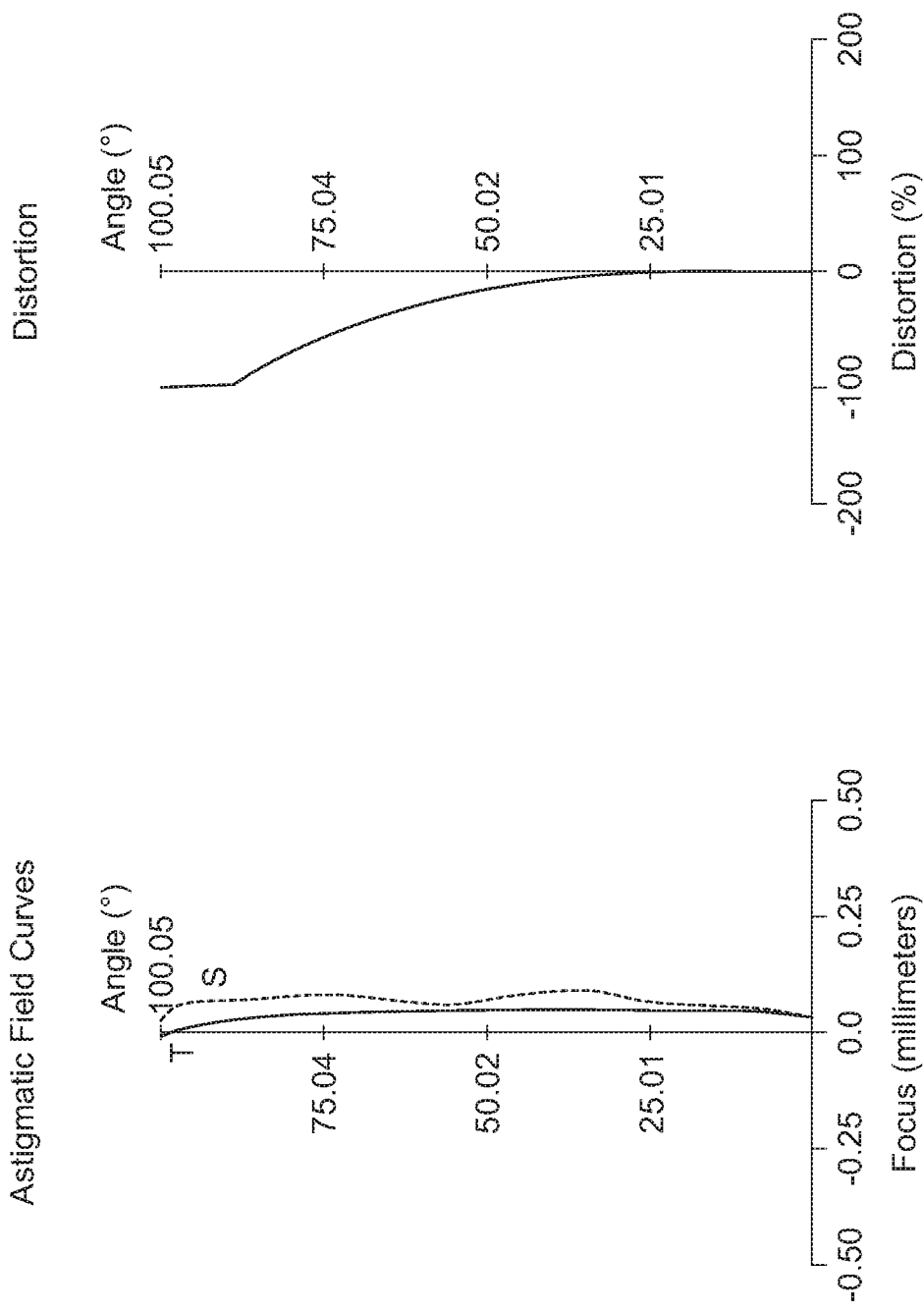
FIGS. 2 to 4 respectively are an astigmatic field curve plot and a distortion plot, a ray fan plot and a relative illuminance plot of the lens assembly 10*a*.
Figure 3:
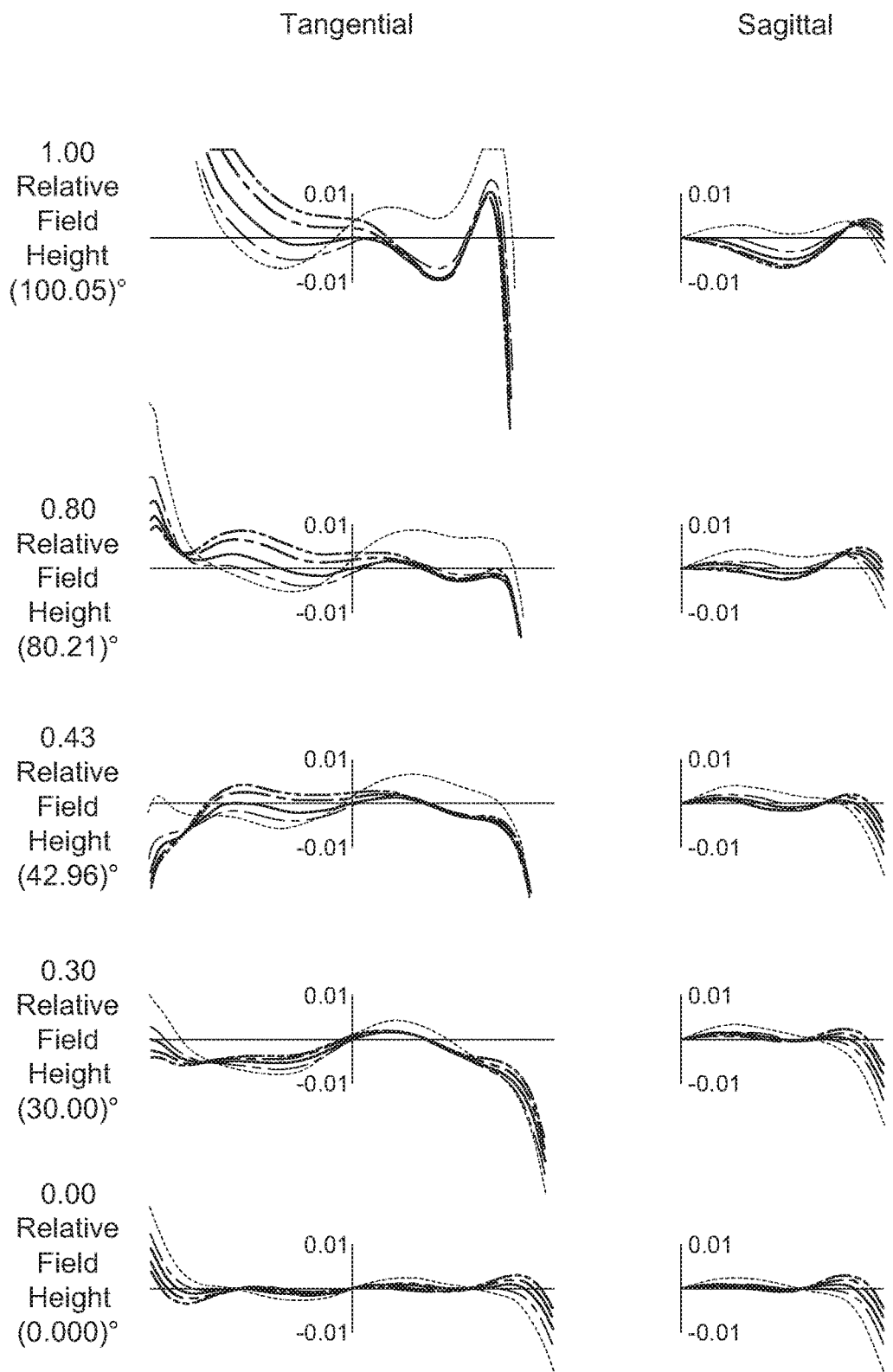
Figure 4:
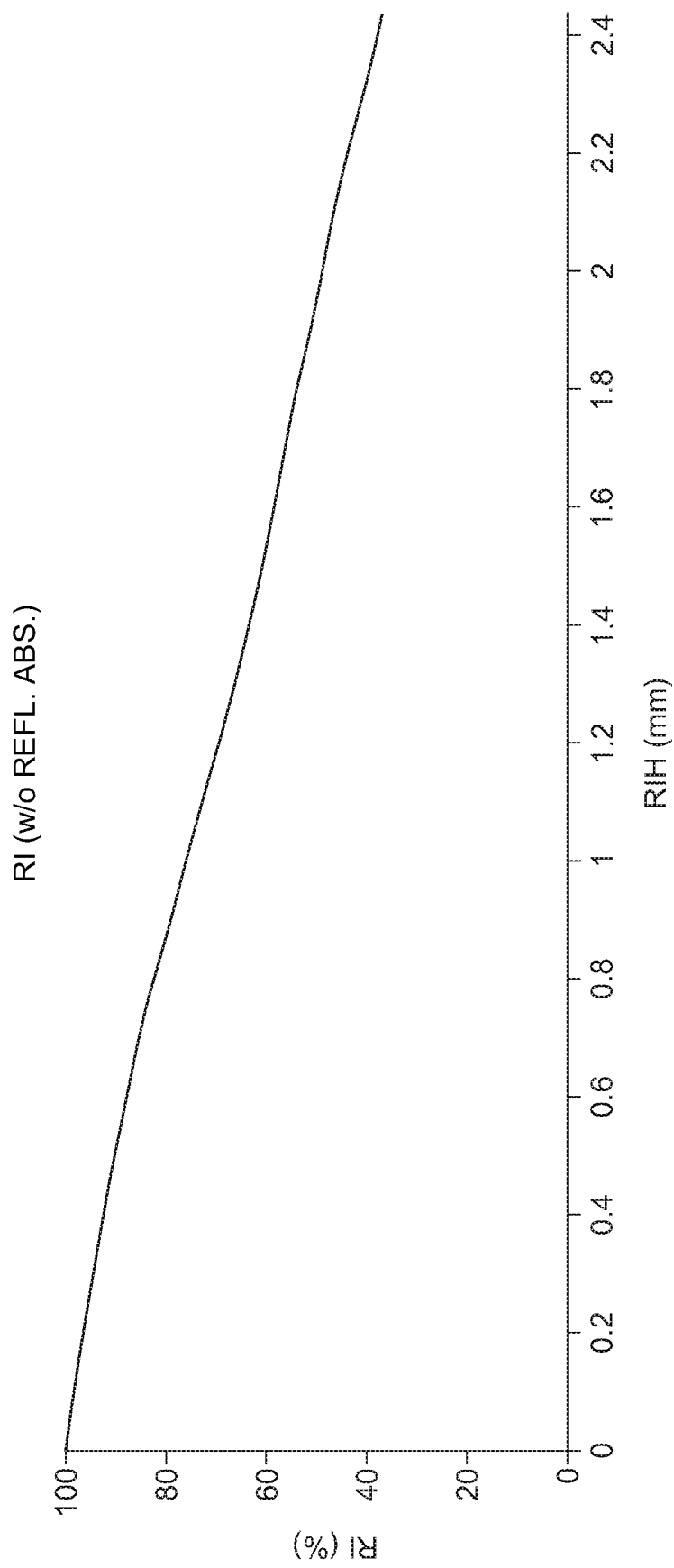

The left-hand side and the right-hand side of FIG. 2 respectively show an astigmatic field curve plot and a distortion plot of the lens assembly 10a, wherein the horizontal axis of the astigmatic field curve plot represents the distance to the focal plane and the vertical axis represents the astigmatic field curve from 0 to the maximum; the horizontal axis of the distortion plot represents distortion percentage and the vertical axis represents the astigmatic field curve from 0 to the maximum. FIG. 3 is a ray fan plot of the lens assembly 10a, wherein the horizontal axis represents the position of the aperture stop 14 through which the light passes, and the vertical axis represents the position of the imaging plane 19 at which the light irradiates. FIG. 4 shows relative illuminance (RI) of the lens assembly 10a. FIGS. 2 to 4 clearly show that the plots based on the simulation data are all within standard ranges and suffice to verify that the lens assembly 10a of the present embodiment really possesses excellent optical quality.

The lens assembly according to an embodiment of the present invention includes a front lens group and a rear lens group. The front group includes two lenses with a negative refractive power, and one of the lenses is an aspherical lens for receiving the light at a wide angle, but the present invention is not limited thereto. The F-number of the lens assembly is greater than or equivalent to 2.0. In an embodiment, the F-number of the lens assembly can be greater than or equivalent to 1.8. In an embodiment, the F-number of the lens assembly can be greater than or equivalent to 1.5. The rear group includes a combined lens (a cemented lens or a doublet lens) and an aspherical lens for correcting aberration and chromatic aberration. The minimum distance between the two lenses of the doublet lens along the optical axis is less than 0.005 mm. The doublet lens can be replaced by a triplet lens, but the present invention is not limited thereto. Each of the doublet lens, the cemented lens, the combined lens, and the triplet lens has corresponding adjacent surfaces whose radii of curvature are substantially identical or similar. The lens assembly includes 5 to 6 lenses with a refractive power, and at least three lenses have an Abbe number greater than 50. The cemented lens of the rear group includes at least one lens whose Abbe number is greater than 50.

In an embodiment, the dN/dT of the third lens of the lens assembly is greater than $-100\times10^{-6}$, and the dN/dT of the fourth lens satisfies is less than $-120\times10^{-6}$, wherein dN is the difference between refractive indexes of light with a wavelength of 587 nm passing the lens at 40° C. and 20° C., and dT is the difference between 40° C. and 20° C., that is, 20. The said difference of refractive indexes allows the lens assembly to have low thermal drift within a working temperature range of −40° C. to 85° C. such that the visible light has a small offset on the focal plane.

In an embodiment, the refractive index of the first lens is greater than 1.55, such that optical path bending can be reduced and relative illuminance (RI) can be increased. The first lens has an Abbe number greater than 55, such that chromatic aberration can be suppressed. The first lens satisfies R1-R2-T<8.8; R1 is the radius of curvature of the lens surface S1, R2 is the radius of curvature of the lens surface S2, T is the thickness, on the optical axis of the lens assembly, of the first lens. Thus, both the fabricability of the first lens and the relative illuminance of the lens assembly can be increased.

In an embodiment, the lens assembly satisfies BFL/TTL<0.2 or |f/f45|<0.3, such that the lens assembly can reduce thermal balance within a working temperature range of −40° C. to 85° C., wherein BFL is length from the lens surface S10 to the imaging surface S15 in the optical axis 12, TTL is length from the lens surface S1 to the imaging surface S15 in the optical axis 12, f is the effective focal length of the lens assembly, and f45 is the effective focal length of the cemented lens.

CRA is the angle formed by the chief ray of the lens assembly passing the maximum imaging height position of the imaging plane and the normal line of the imaging plane near and parallel to the optical axis. In the embodiments of the present invention, CRA<18°. Thus, by adjusting the angle at which the chief ray passing the imaging plane at the maximum imaging height position, a balance among imaging illumination, optical quality and miniaturization of lens assembly can be achieved.

Dist is the optical distortion at the imaging height position of the lens assembly measured when the full field of view FOV is equivalent to 160°. In the embodiments of the present invention, Dist<−67%. Thus, optical distortion of the lens assembly can be effectively suppressed, peripheral deformation and distortion of the frame can be avoided, and optical quality can be optimized.

Figure 5:
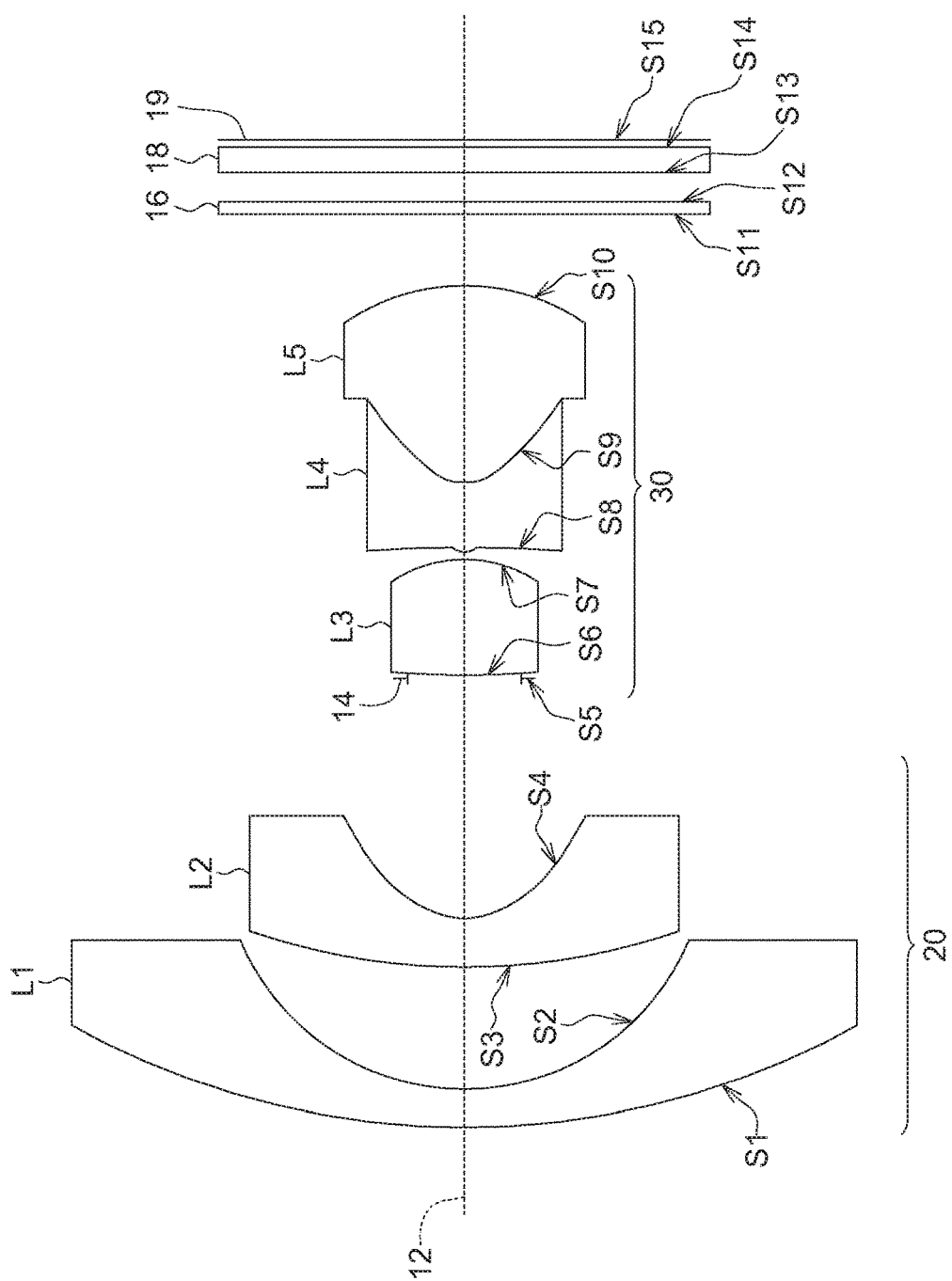
FIG. 5 is a schematic diagram of a lens assembly 10*b* according to an embodiment of the present invention.

The design of a lens assembly according to a second embodiment of the present invention is disclosed below. FIG. 5 is a schematic diagram of a lens assembly 10b. The first lens L1 and the second lens L2 form a first lens group 20 (such as the front group) with a negative refractive power. The third lens L3, the fourth lens L4 and the fifth lens L5 form a second lens group 30 (such as the rear group) with a positive refractive power. In the present embodiment, the refractive powers of the first lens L1 to the fifth lens L5 of the lens assembly 10b sequentially are: negative, negative, positive, negative, positive, and each of the second lens, the third lens L3, the fourth lens L4 and the fifth lens L5 is an aspherical plastic lens. In an embodiment, the aspherical plastic lens can be replaced by aspherical glass lenses. In the present embodiment, the fourth lens L4 and the fifth lens L5 form a cemented lens, but the embodiments of the present invention are not limited thereto. The design parameters, shapes and aspherical coefficients of the lens assembly 10b are listed in Table 3 and Table 4.

TABLE 3

F/# = 2.06; TTL = 16.1 (mm); LT = 13.7 (mm)
EFL = 1.16 (mm); FOV = 200°; EFL/LT = 0.085

| Surface | Radius of curvature (mm) | Interval (mm) | Refractive power | Abbe number | Element |
|---|---|---|---|---|---|
| S1 | 13.28 | 0.58 | 1.70 | 55.53 | L1 (convex-concave) |
| S2 | 3.94 | 2.01 | | | |
| S3* | 13.56 | 0.83 | 1.53 | 55.35 | L2 (aspherical lens) |
| S4* | 1.53 | 3.92 | | | |
| S5 | INF. | 0.05 | | | aperture 14 |
| S6* | 9.63 | 1.92 | 1.65 | 23.27 | L3 (aspherical lens) |
| S7* | −2.21 | 0.05 | | | |
| S8* | 9.84 | 1.11 | 1.65 | 22.38 | L4 (aspherical lens) |
| S9* | 0.64 | 3.23 | 1.54 | 56.08 | L5 (aspherical lens) |
| S10* | −2.79 | 1.18 | | | |
| S11 | INF. | 0.21 | 1.52 | 64.17 | IR filter 16 |
| S12 | INF. | 0.50 | | | |
| S13 | INF. | 0.40 | 1.52 | 64.17 | Cover glass 18 |
| S14 | INF. | 0.13 | | | |
| S15 | INF. | | | | Imaging plane 19 |

The aspherical coefficient and the conic coefficient of each order of the spherical polynomial of the aspherical lens according to the second embodiment of the present invention are listed in Table 4.

TABLE 4

| | S3* | S4* | S6* | S7* | S8* | S9* | S10* |
|---|---|---|---|---|---|---|---|
| k | −23.40 | −1.45 | 64.59 | 0.82 | 44.19 | −1.49 | 0.60 |
| $\alpha 4$ | 2.11E−02 | 5.42E−02 | −3.07E−02 | −1.22E−02 | −7.08E−02 | 2.87E−02 | 1.91E−02 |
| $\alpha 6$ | −5.80E−03 | 3.72E−03 | 6.51E−03 | 1.87E−02 | 2.98E−02 | −1.41E−02 | −6.12E−03 |
| $\alpha 8$ | 8.16E−04 | −8.18E−03 | −4.55E−02 | −5.31E−03 | −1.02E−02 | 6.78E−03 | 3.56E−03 |
| $\alpha 10$ | −6.71E−05 | 2.49E−03 | 4.76E−02 | 9.52E−04 | 5.06E−04 | −2.40E−03 | −9.00E−04 |
| $\alpha 12$ | 3.05E−06 | −2.57E−04 | −2.25E−02 | 0 | 0 | 3.28E−04 | 1.11E−04 |
| $\alpha 14$ | −5.90E−08 | 1.12E−06 | 0 | 0 | 0 | 0 | 0 |

The interval of the surface S1 is the distance on the optical axis 12 from the surface S1 to the surface S2. The interval of the surface S14 is the distance on the optical axis 12 from the surface S14 to the imaging plane 19 of a visible light at an effective focal length. The lens assembly includes three lenses whose Abbe numbers are greater than 50. The lens assembly of the rear group includes at least one lens whose Abbe number is greater than 50.

Figure 6:
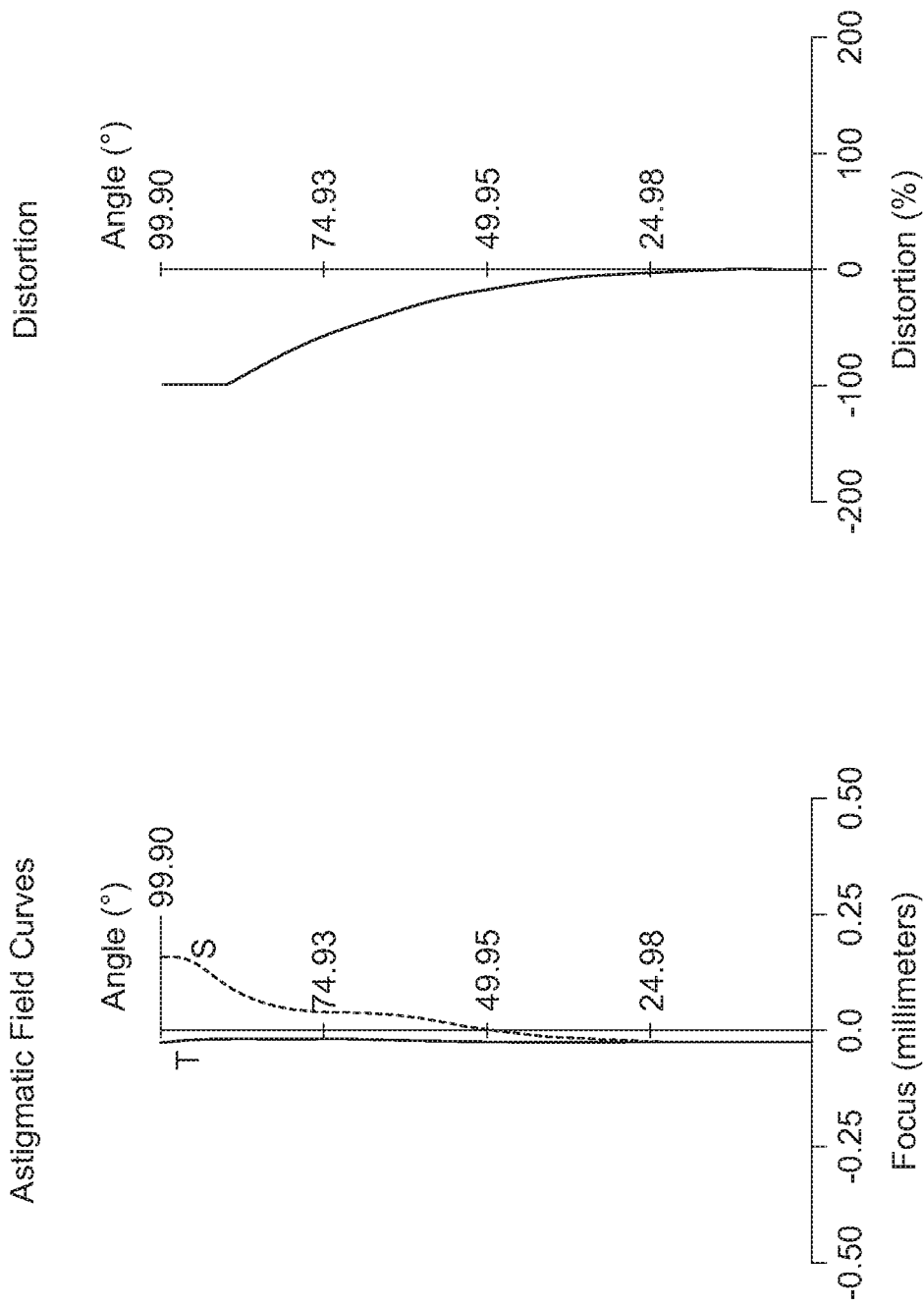
FIGS. 6 to 8 respectively are an astigmatic field curve plot and a distortion plot, a ray fan plot and a relative illuminance plot of the lens assembly 10*b*.
Figure 7:
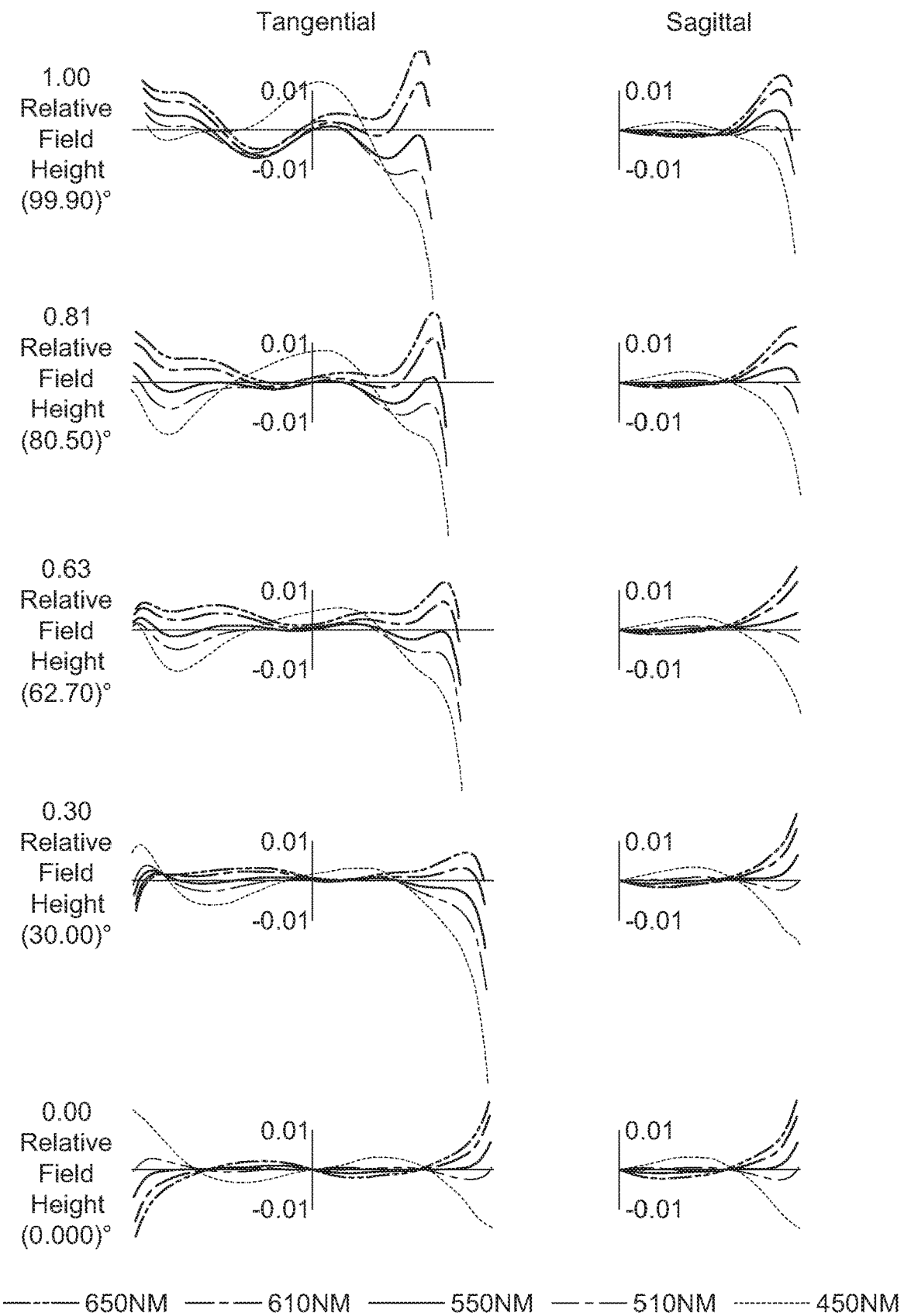
Figure 8:
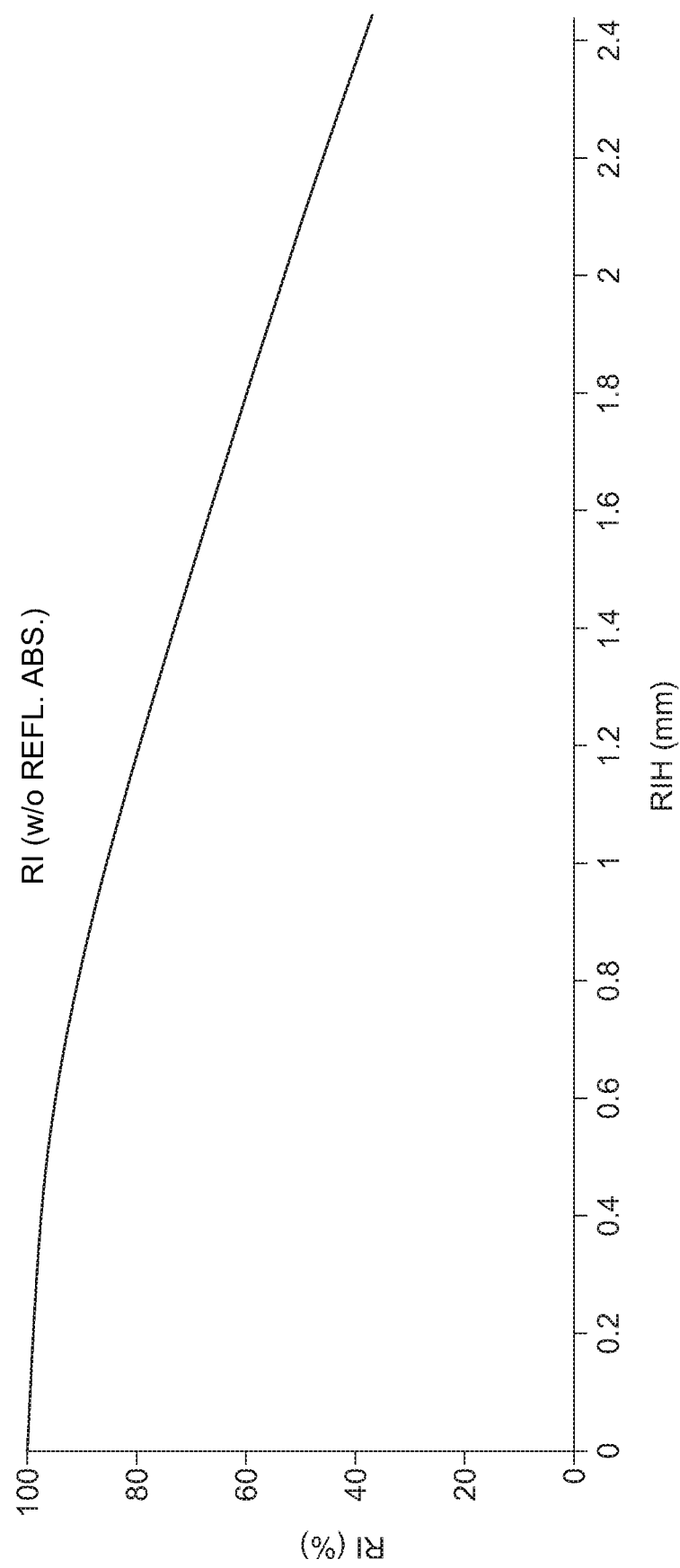

The left-hand side and the right-hand side of FIG. 6 respectively show an astigmatic field curve plot and a distortion plot of the lens assembly 10b. FIG. 7 is a ray fan plot of the lens assembly 10b. FIG. 8 shows relative illuminance of the lens assembly 10b. FIGS. 6 to 8 clearly show that the plots based on the simulation data are all within standard ranges and suffice to verify that the lens assembly 10b of the present embodiment really possesses excellent optical quality.

Figure 9:
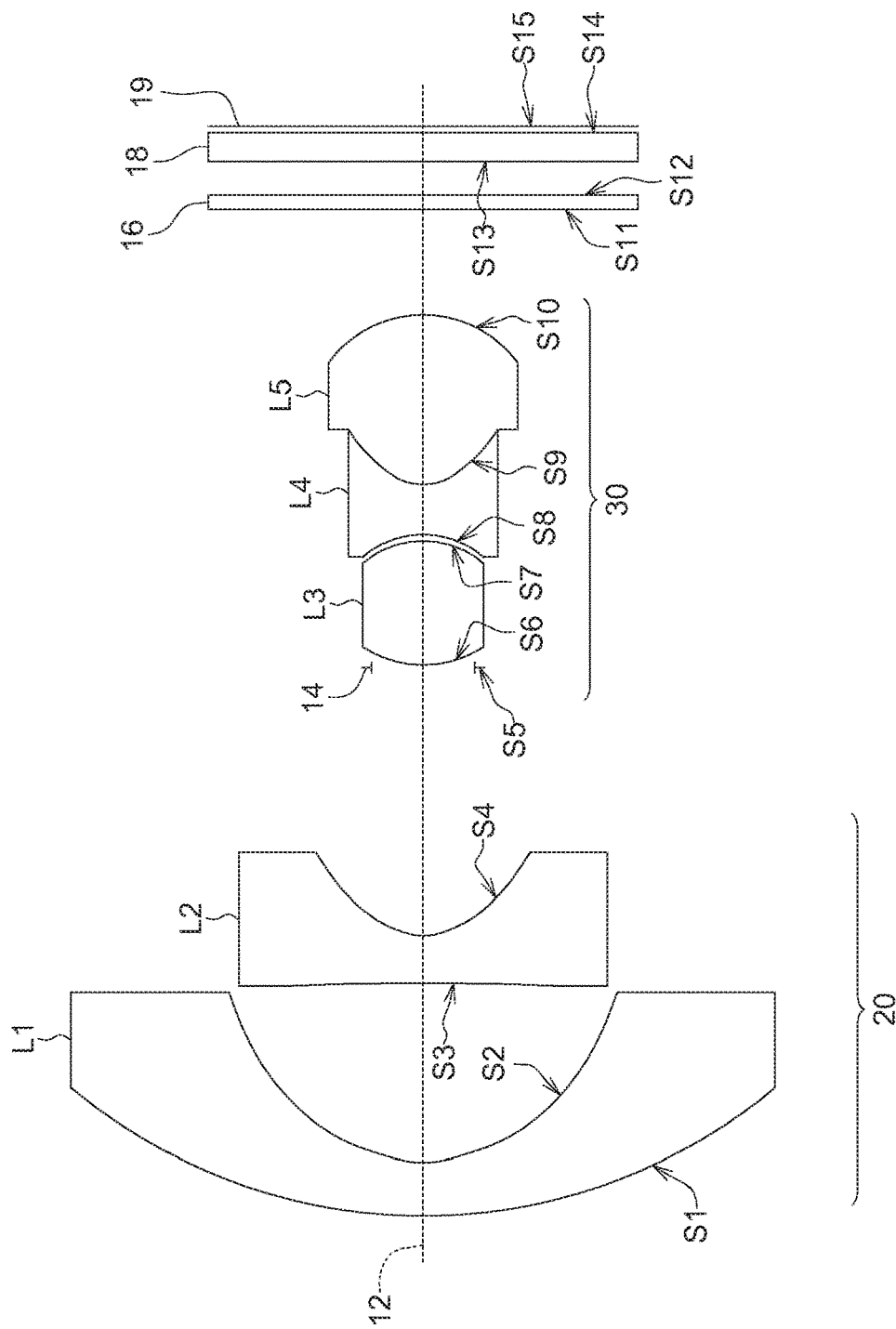
FIG. 9 is a schematic diagram of a lens assembly 10*c* according to an embodiment of the present invention.

The design of a lens assembly according to a third embodiment of the present invention is disclosed below. FIG. 9 is a schematic diagram of a lens assembly 10c. The first lens L1 and the second lens L2 form a first lens group 20 with a negative refractive power. The third lens L3, the fourth lens L4 and the fifth lens L5 form a second lens group 30 with a positive refractive power. In the present embodiment, the refractive powers of the first lens L1 to the fifth lens L5 of the lens assembly 10c sequentially are: negative, negative, positive, negative, positive, and each of the second lens, the third lens L3, the fourth lens L4 and the fifth lens L5 is an aspherical plastic lens. In an embodiment, the aspherical plastic lens can be replaced by aspherical glass lenses. In the present embodiment, the fourth lens L4 and the fifth lens L5 form a cemented lens, but the embodiments of the present invention are not limited thereto. The design parameters, appearance and the aspherical coefficient of the lens assembly 10c are listed in Table 5 and Table 6.

TABLE 5

F/# = 2.05; TTL = 16.1 (mm); LT = 13.3 (mm)
EFL = 1.158 (mm); FOV = 200°; EFL/LT = 0.087

| Surface | Radius of curvature (mm) | Interval (mm) | Refractive power | Abbe number | Element |
|---|---|---|---|---|---|
| S1 | 12.48 | 0.80 | 1.70 | 55.53 | L1 (convex-concave) |
| S2 | 3.94 | 2.61 | | | |
| S3* | −72.53 | 0.72 | 1.53 | 55.35 | L2 (aspherical lens) |
| S4* | 1.84 | 3.95 | | | |
| S5 | INF. | 0.05 | | | Aperture 14 |
| S6* | 2.60 | 1.86 | 1.65 | 23.27 | L3 (aspherical lens) |
| S7* | −1.23 | 0.05 | | | |
| S8* | −1.50 | 0.76 | 1.67 | 20.40 | L4 (aspherical lens) |
| S9* | 1.04 | 2.51 | 1.53 | 55.35 | L5 (aspherical lens) |
| S10* | −1.98 | 1.54 | | | |
| S11 | INF. | 0.21 | 1.52 | 64.17 | IR filter 16 |
| S12 | INF. | 0.50 | | | |
| S13 | INF. | 0.40 | 1.52 | 64.17 | Cover glass 18 |
| S14 | INF. | 0.13 | | | |
| S15 | INF. | | | | Imaging plane 19 |

The aspherical coefficient and the conic coefficient of each order of the spherical polynomial of the aspherical lens surface according to the third embodiment of the present invention are listed in Table 6.

TABLE 6

| | S3* | S4* | S6* | S7* | S8* | S9* | S10* |
|---|---|---|---|---|---|---|---|
| k | 85.82 | −3.17 | −7.71 | −2.54 | 0.29 | −2.19 | 0.02 |
| α4 | 4.82E−03 | 4.10E−02 | 5.26E−02 | 2.82E−01 | 3.98E−01 | 5.90E−02 | 2.98E−02 |
| α6 | −1.89E−03 | −2.65E−03 | −1.30E−02 | −4.02E−01 | −4.43E−01 | −2.69E−02 | −5.55E−03 |
| α8 | 3.20E−04 | −5.10E−03 | −1.83E−02 | 2.36E−01 | 2.56E−01 | 6.74E−03 | 4.89E−03 |
| α10 | −2.74E−05 | 2.79E−03 | 2.78E−02 | −5.64E−02 | −5.05E−02 | 2.32E−03 | −1.54E−03 |
| α12 | 1.18E−06 | −5.80E−04 | −1.20E−02 | 0 | 0 | −7.38E−04 | 2.53E−04 |
| α14 | −1.98E−08 | 4.74E−05 | 0 | 0 | 0 | 0 | 0 |

The interval of the surface S1 is the distance on the optical axis 12 from the surface S1 to the surface S2. The interval of the surface S14 is the distance on the optical axis 12 from the surface S14 to the imaging plane 19 of a visible light at an effective focal length. The lens assembly of the front group includes at least two lenses whose Abbe numbers are greater than 50.

Figure 10:
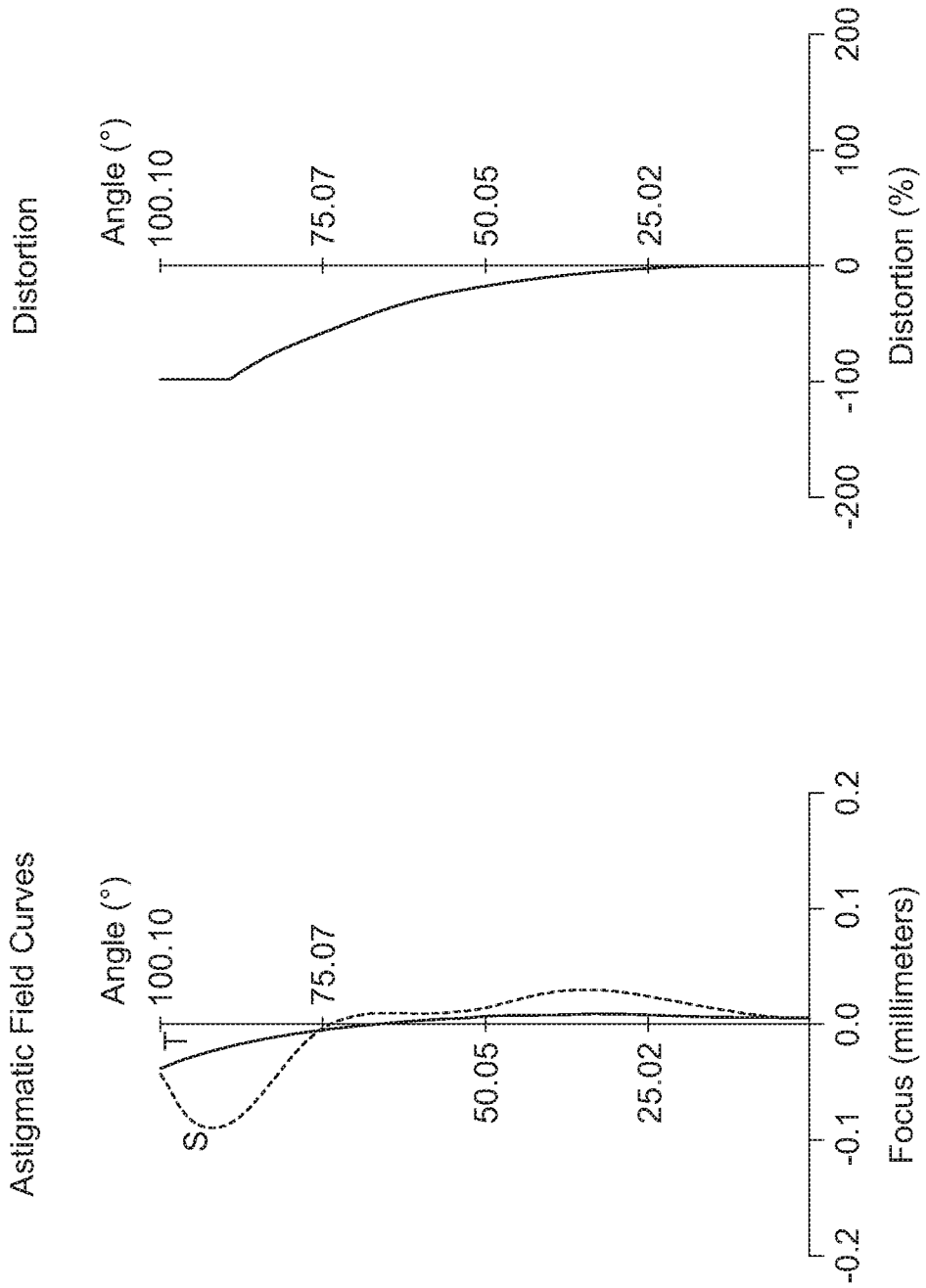
FIGS. 10 to 12 respectively are an astigmatic field curve plot and a distortion plot, a ray fan plot and a relative illuminance plot of the lens assembly 10*c*.
Figure 11:
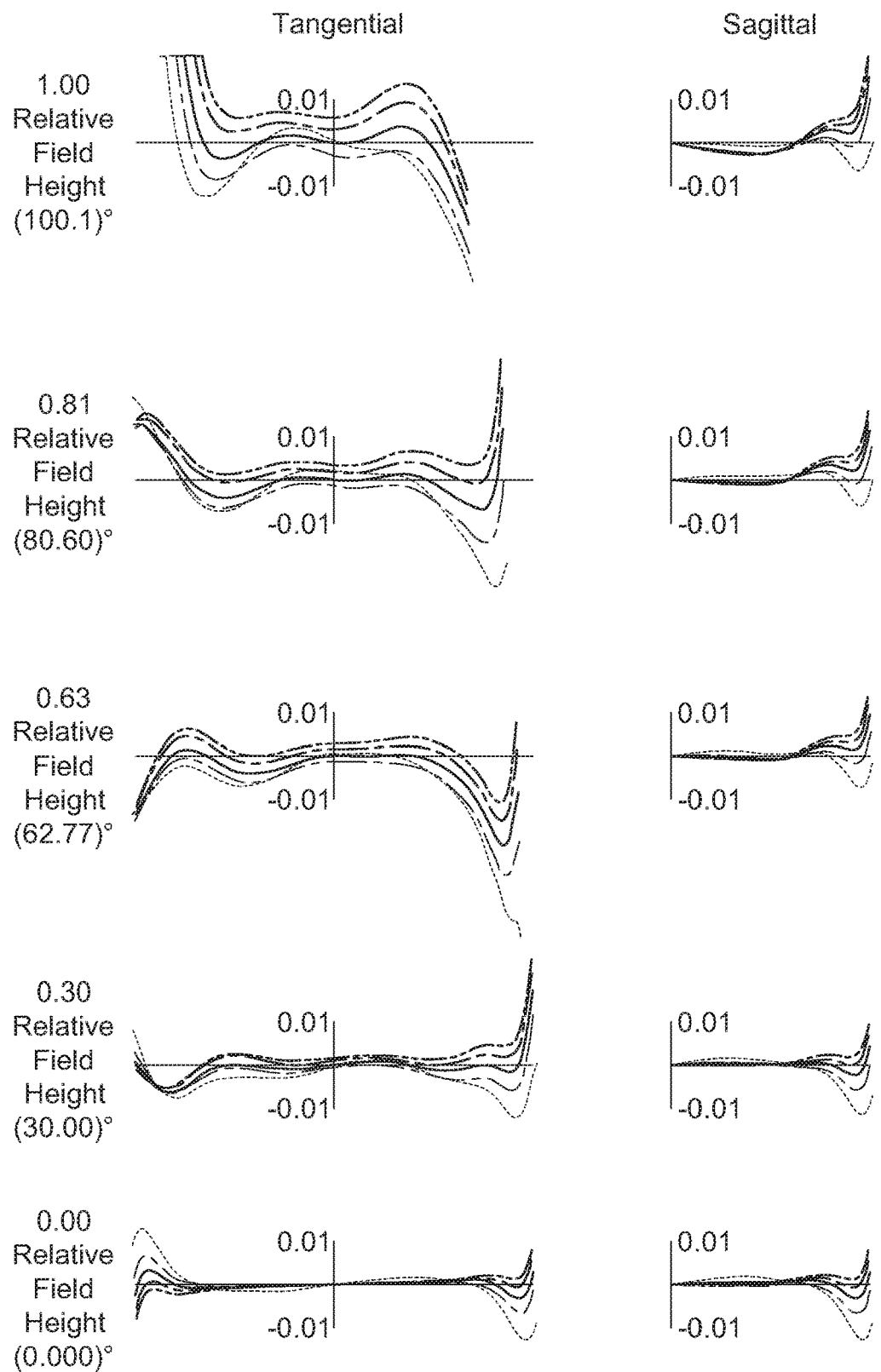
Figure 12:
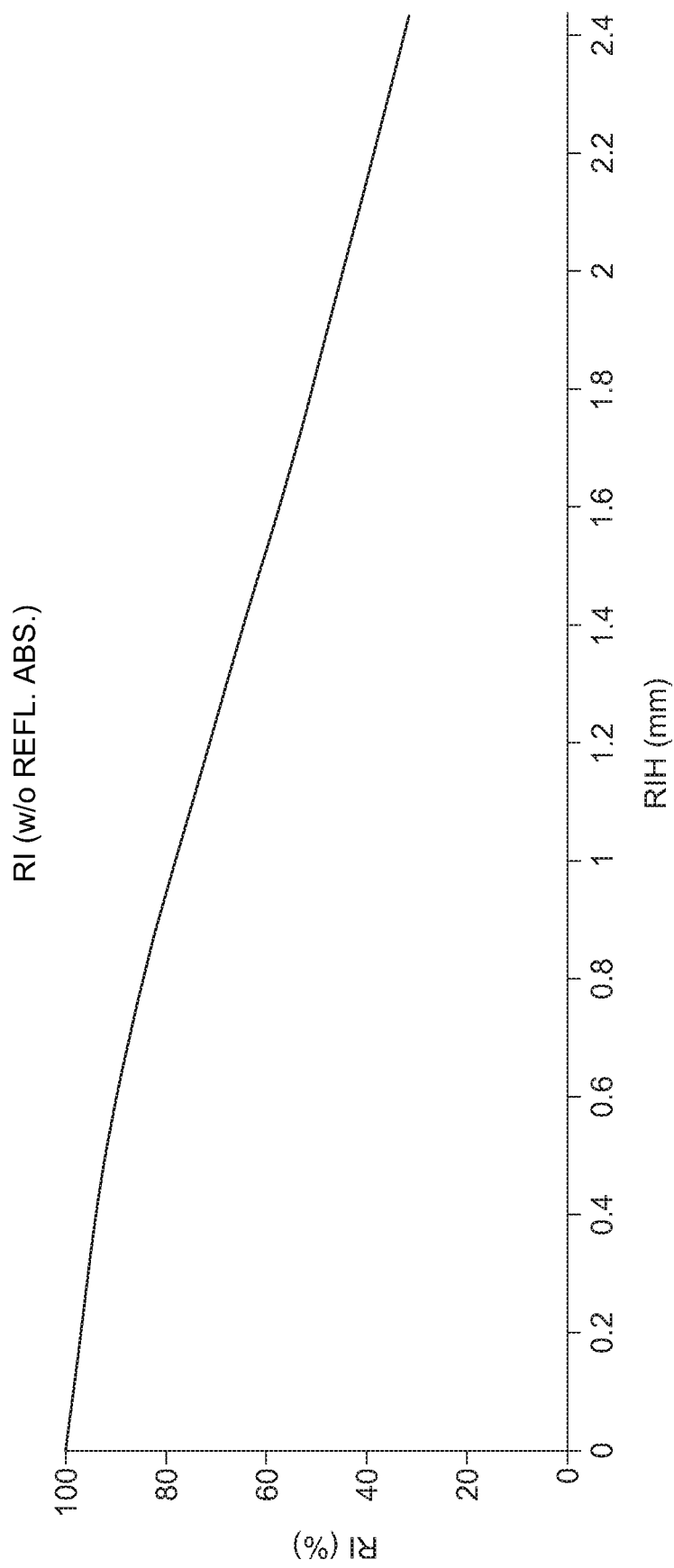

The left-hand side and the right-hand side of FIG. 10 respectively show an astigmatic field curve plot and a distortion plot of the lens assembly 10c. FIG. 11 is a ray fan plot of the lens assembly 10c. FIG. 12 shows relative illuminance of the lens assembly 10c. FIGS. 10 to 12 clearly show that the plots based on the simulation data are all within standard ranges and suffice to verify that the lens assembly 10c of the present embodiment really possesses excellent optical quality.

Figure 13:
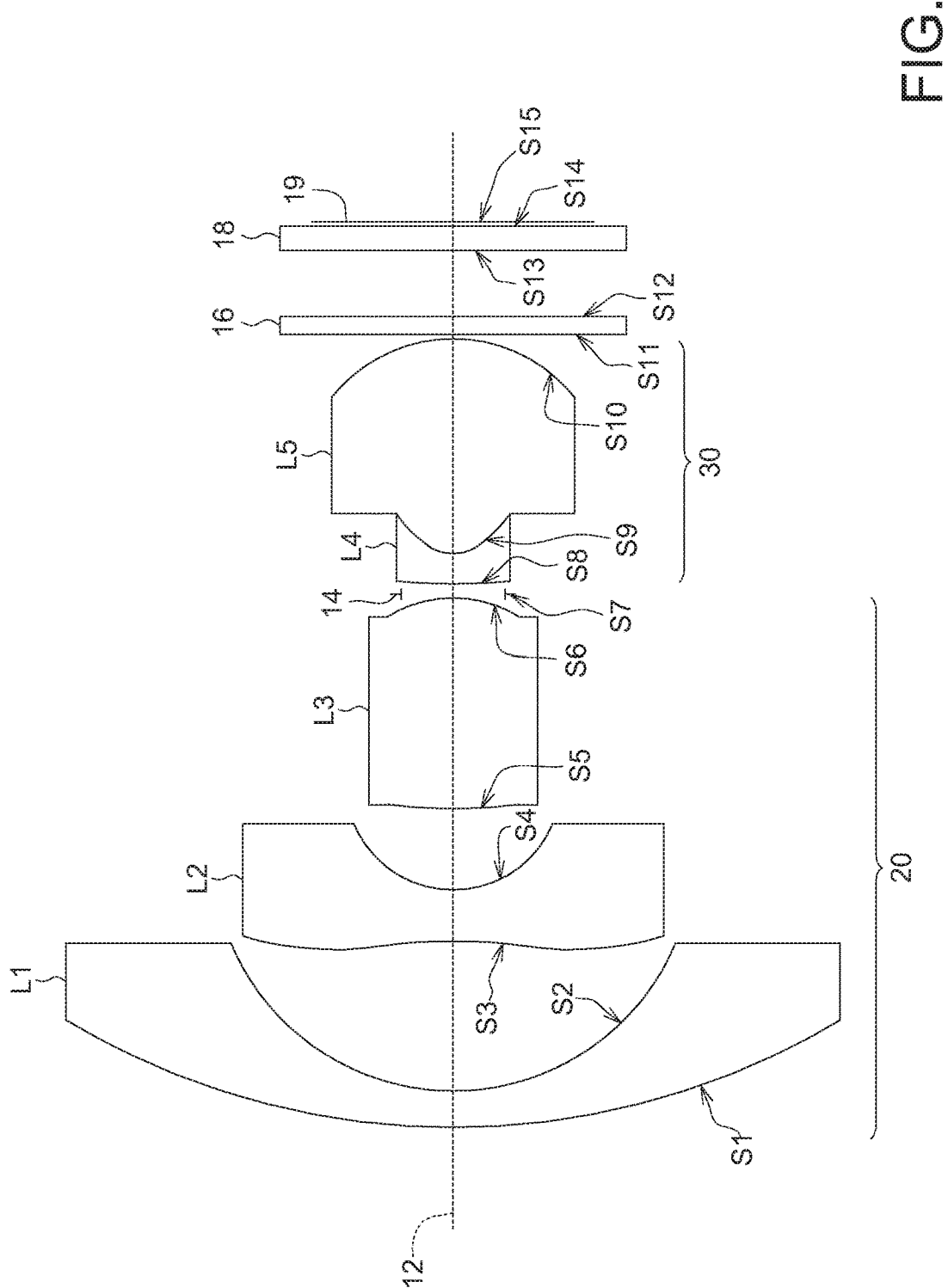
FIG. 13 is a schematic diagram of a lens assembly 10*d* according to an embodiment of the present invention.

The design of a lens assembly according to a fourth embodiment of the present invention is disclosed below. FIG. 13 is a schematic diagram of a lens assembly 10d. The first lens L1, the second lens L2 and the third lens L3 form a first lens group 20 with a positive refractive power. The fourth lens L4 and the fifth lens L5 form a second lens group 30 with a positive refractive power. In the present embodiment, the refractive powers of the first lens L1 to the fifth lens L5 of the lens assembly 10d sequentially are: negative, negative, positive, negative, positive, and each of the second lens, the third lens L3, the fourth lens L4 and the fifth lens L5 is an aspherical plastic lens. In an embodiment, the aspherical plastic lens can be replaced by aspherical glass lenses. In the present embodiment, the fourth lens L4 and the fifth lens L5 form a cemented lens, but the embodiments of the present invention are not limited thereto. The design parameters, appearance and the aspherical coefficient of the lens assembly 10d are listed in Table 7 and Table 8.

TABLE 7

F/# = 2.05; TTL = 16.1 (mm); LT = 14.1 (mm)
EFL = 1.08 (mm); FOV = 198.2°; EFL/LT = 0.077

| Surface | Radius of curvature (mm) | Interval (mm) | Refractive power | Abbe number | Element |
|---|---|---|---|---|---|
| S1 | 12.94 | 0.65 | 1.70 | 55.53 | L1 (convex-concave) |
| S2 | 4.18 | 2.68 | | | |
| S3* | −3.87 | 0.87 | 1.53 | 55.35 | L2 (aspherical lens) |
| S4* | 1.78 | 1.45 | | | |
| S5* | 5.22 | 3.81 | 1.65 | 23.27 | L3 (aspherical lens) |
| S6* | −1.60 | 0.05 | | | |

TABLE 7-continued

F/# = 2.05; TTL = 16.1 (mm); LT = 14.1 (mm)
EFL = 1.08 (mm); FOV = 198.2°; EFL/LT = 0.077

| Surface | Radius of curvature (mm) | Interval (mm) | Refractive power | Abbe number | Element |
|---|---|---|---|---|---|
| S7 | INF. | 0.20 | | | Aperture 14 |
| S8* | −69.71 | 0.55 | 1.64 | 23.08 | L4 (aspherical lens) |
| S9* | 0.59 | 3.84 | 1.53 | 55.35 | L5 (aspherical lens) |
| S10* | −3.27 | 0.05 | | | |
| S11 | INF. | 0.30 | 1.52 | 64.17 | IR filter 16 |
| S12 | INF. | 1.21 | | | |
| S13 | INF. | 0.40 | 1.52 | 64.17 | Cover glass 18 |
| S14 | INF. | 0.05 | | | |
| S15 | INF. | | | | Imaging plane 19 |

The aspherical coefficient and the conic coefficient of each order of the spherical polynomial of the aspherical lens surface according to the fourth embodiment of the present invention are listed in Table 8.

TABLE 8

| | S3* | S4* | S5* | S6* | S8* | S9* | S10* |
|---|---|---|---|---|---|---|---|
| k | −40.51 | −0.80 | −5.92 | −6.91 | 81.19 | −1.04 | −0.16 |
| $\alpha1$ | 0 | 0 | 0 | 0 | 0 | 0 | 0 |
| $\alpha2$ | 0 | 0 | 0 | 0 | 0 | 0 | −1.05E−01 |
| $\alpha3$ | 0 | 0 | 0 | 0 | 0 | −4.57E−02 | 2.77E−02 |
| $\alpha4$ | 4.33E−03 | 6.88E−02 | −9.05E−03 | −4.69E−02 | 2.63E−02 | −1.12E−01 | −7.94E−03 |
| $\alpha5$ | 0 | 0 | 0 | 0 | 0 | −1.05E−02 | 1.42E−02 |
| $\alpha6$ | −2.58E−04 | −4.37E−02 | 2.76E−03 | 2.58E−02 | −5.08E−02 | 1.11E−01 | −6.45E−03 |
| $\alpha7$ | 0 | 0 | 0 | 0 | 0 | −1.55E−02 | −1.24E−03 |
| $\alpha8$ | 2.21E−06 | 2.39E−02 | −4.69E−04 | −2.61E−02 | 2.34E−02 | −5.75E−02 | 1.39E−03 |
| $\alpha9$ | 0 | 0 | 0 | 0 | 0 | 5.10E−03 | 1.34E−04 |
| $\alpha10$ | 2.53E−07 | −4.12E−03 | −8.55E−04 | 1.15E−02 | 8.39E−04 | 1.17E−02 | −1.93E−04 |
| $\alpha11$ | 0 | 0 | 0 | 0 | 0 | 1.12E−02 | 7.45E−07 |
| $\alpha12$ | 0 | 0 | 0 | 0 | 0 | −5.97E−05 | 1.16E−06 |
| $\alpha13$ | 0 | 0 | 0 | 0 | 0 | 7.58E−03 | 9.45E−08 |
| $\alpha14$ | 0 | 0 | 0 | 0 | 0 | −9.92E−03 | 2.78E−07 |

The interval of the surface S1 is the distance on the optical axis 12 from the surface S1 to the surface S2. The interval of the surface S14 is the distance on the optical axis 12 from the surface S14 to the imaging plane 19 of a visible light at an effective focal length. The lens assembly of the front group includes at least two lenses whose Abbe numbers are greater than 50.

Figure 14:
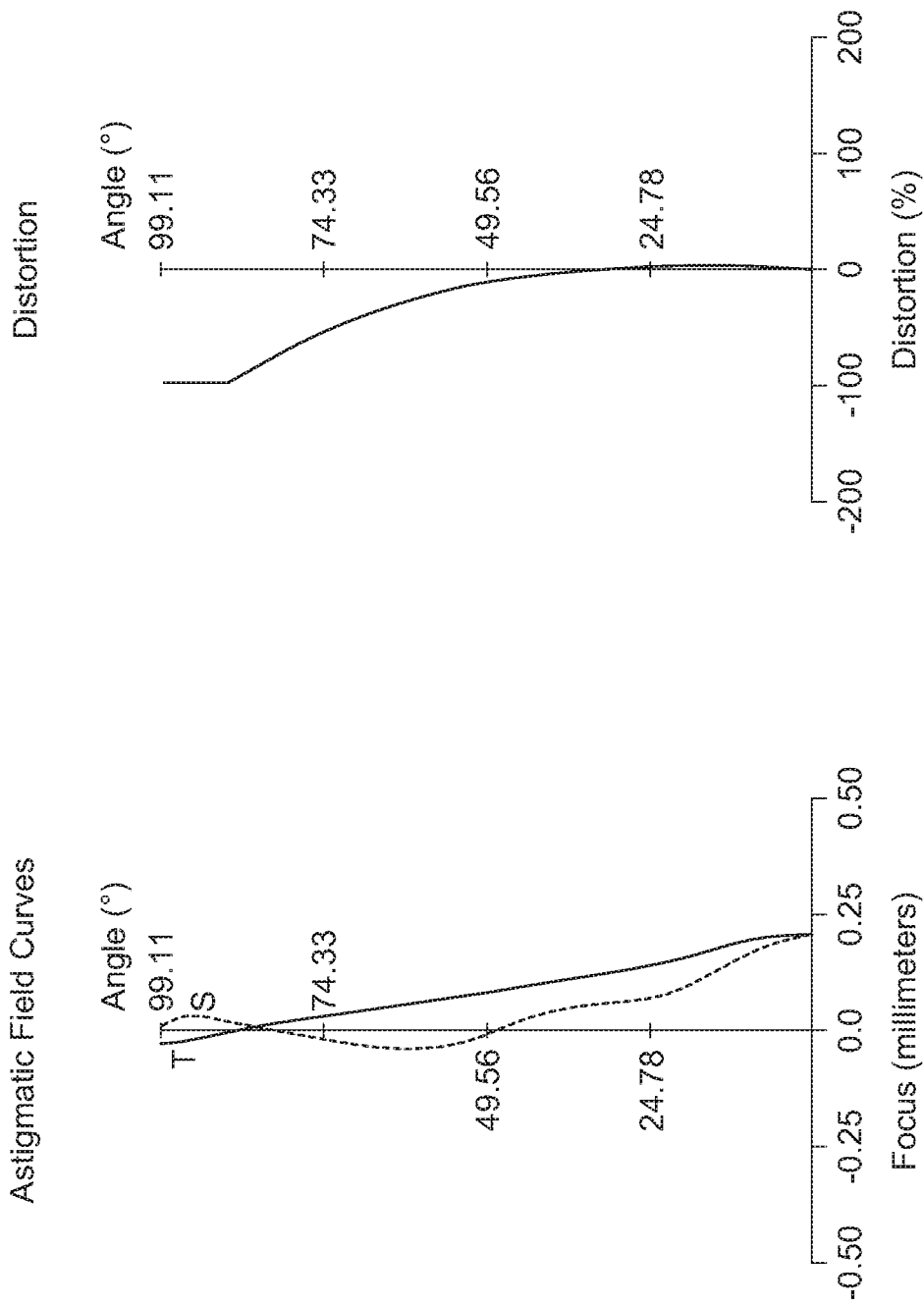
FIGS. 14 to 16 respectively are an astigmatic field curve plot and a distortion plot, a ray fan plot and a relative illuminance plot of the lens assembly 10*d*.
Figure 15:
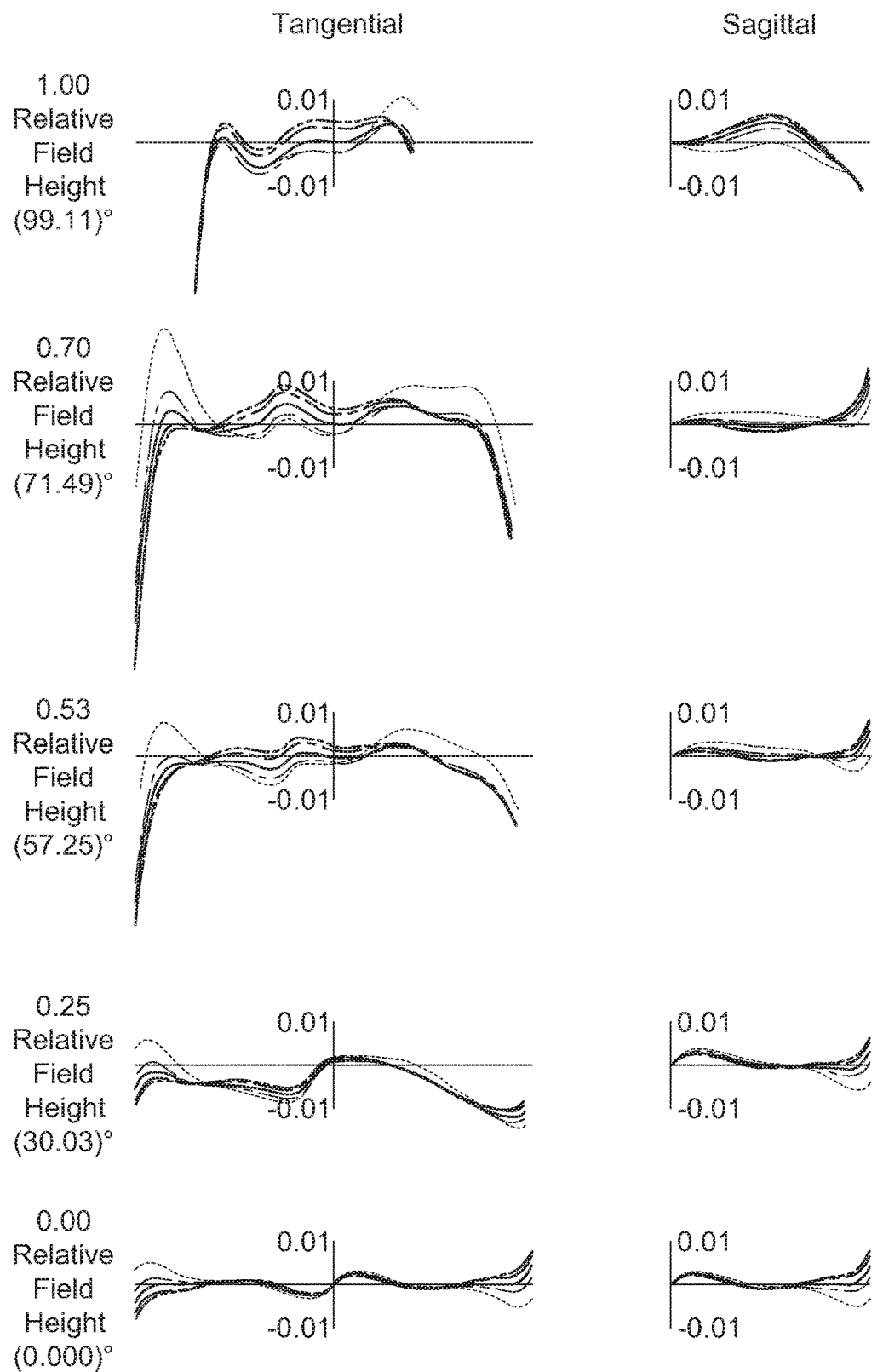
Figure 16:
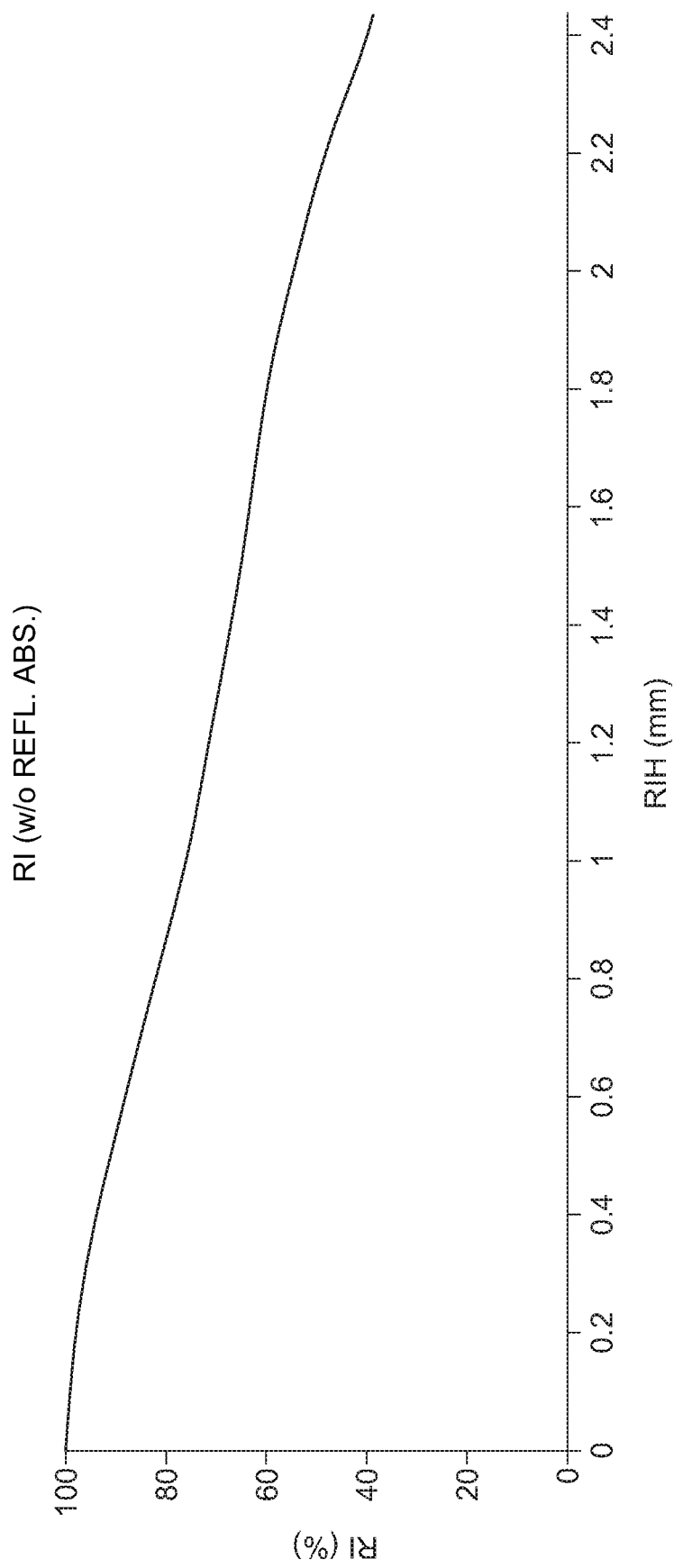

The left-hand side and the right-hand side of FIG. 14 respectively show an astigmatic field curve plot and a distortion plot of the lens assembly 10d. FIG. 15 is a ray fan plot of the lens assembly 10d. FIG. 16 shows relative illuminance of the lens assembly 10d. FIGS. 14 to 16 clearly show that the plots based on the simulation data are all within standard ranges and suffice to verify that the lens assembly 10d of the present embodiment really possesses excellent optical quality.

While the invention has been described by example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A lens assembly, located between a magnification side and a reduction side, comprising:
    a first lens, a second lens, a third lens, a fourth lens, and a fifth lens, arranged from the magnification side to the reduction side, wherein the first lens is a glass lens, the fourth lens and the fifth lens are combined into a cemented lens having a cemented surface, wherein the cemented surface is an aspherical surface; and
    an aperture located between the second lens and the fourth lens, wherein the lens assembly comprises 5 to 6 lenses with a refractive power, and the lens assembly satisfies the following conditions:
    the dN/dT of the third lens >−100×10⁻⁶, the dN/dT of the fourth lens <−120×10⁻⁶, wherein dN is the difference between refractive indexes of light with a wavelength of 587 nm passing the lens at 40° C. and 20° C., and dT is the difference between 40° C. and 20° C.

2. The lens assembly according to claim 1, wherein the lens assembly satisfies one of the following conditions: (1) F-number (F/#) ≥1.5; (2) 180°<full field of view (FOV) <220°.

3. The lens assembly according to claim 1, wherein the lens assembly comprises three lenses whose Abbe numbers are greater than 50.

4. The lens assembly according to claim 1, wherein the lens assembly satisfies one of the following conditions: (1) LT is the length from the lens surface of the first lens facing the magnification side to the lens surface of the fifth lens facing the reduction side on the optical axis of the lens assembly and is less than 14.5 mm; (2) TTL is the length from the lens surface of the first lens facing the magnification side to the imaging plane on the optical axis of the lens assembly, wherein TTL is less than 16.5 mm.

5. The lens assembly according to claim 1, wherein the lens assembly satisfies one of the following conditions: (1) the lenses arranged from the image magnification side to the image reduction side sequentially are: convex-concave lens, aspherical lens, aspherical lens, aspherical lens and aspherical lens; (2) the refractive powers of the lenses arranged from the image magnification side to the image reduction side, sequentially are negative, negative, positive, negative, positive.

6. The lens assembly according to claim 1, wherein BFL is the effective focal length from the lens surface of the fifth lens facing the reduction side to the imaging plane on the optical axis of the lens assembly; TTL is the length from the lens surface of the first lens facing the magnification side to the imaging plane on the optical axis of the lens assembly; f is the effective focal length of the lens assembly; f45 is the effective focal length of the cemented lens; CRA is the angle formed by the chief ray of the lens assembly passing the maximum imaging height of the imaging plane and the normal line of the imaging plane near and parallel to the optical axis; Dist is the optical distortion at the imaging height of the lens assembly measured when FOV=160°; the lens assembly satisfies one of the following conditions: (1) BFL/TTL <0.2; (2) |f/f45|<0.3; (3) CRA <18°; (4) Dist <−67%.

7. The lens assembly according to claim 1: wherein the second lens, the third lens, the fourth lens, and the fifth lens are aspherical lenses; R1 is the radius of curvature of the lens surface of the first lens facing the magnification side, R2 is the radius of curvature of the lens surface of the first lens facing the reduction side, T is the thickness, on the optical axis of the lens assembly, of the first lens, the lens assembly further satisfies the following conditions: the refractive index of the first lens >1.55, the Abbe number of the first lens >55, and R1-R2-T<8.8.

8. The lens assembly according to claim 7, wherein the lens assembly satisfies one of the following conditions: (1) F-number (F/#) ≥1.5; (2) 180°<full field of view (FOV) <220°.

9. The lens assembly according to claim 7, wherein the lens assembly comprises three lenses whose Abbe numbers are greater than 50.

10. The lens assembly according to claim 7, wherein the lens assembly satisfies one of the following conditions: (1) the lens assembly comprises at least one aspherical lens between the magnification side and the aperture; (2) the lens assembly comprises the cemented lens between the reduction side and the aperture, and the difference in the radius of curvature between two adjacent surfaces of the cemented lens <0.005 mm; (3) the aperture is located between the second lens and the third lens; (4) the aperture is located between the third lens and the fourth lens; (5) the second lens, the third lens, the fourth lens and the fifth lens are all formed of plastics.

11. The lens assembly according to claim 7, wherein the lens assembly satisfies one of the following conditions: (1) LT is less than 14.5 mm; (2) TTL is less than 16.5 mm.

12. The lens assembly according to claim 7, wherein the lens assembly satisfies one of the following conditions: (1) the lenses arranged from the image magnification side to the image reduction side sequentially are: convex-concave lens, aspherical lens, aspherical lens, aspherical lens and aspherical lens; (2) the refractive powers of the lenses arranged from the image magnification side to the image reduction side, sequentially are negative, negative, positive, negative, positive.

13. The lens assembly according to claim 7, wherein the lens assembly satisfies one of the following conditions: (1) BFL/TTL <0.2; (2) |f/f45|<0.3; (3) CRA <18°; (4) Dist <−67%.

14. The lens assembly according to claim 7, further comprising an aperture located between the second lens and the fourth lens.

15. The lens assembly according to claim 14, wherein the lens assembly satisfies one of the following conditions: (1) F-number (F/#) ≥1.5; (2) 180°<full field of view (FOV) <220°.

16. The lens assembly according to claim 14, wherein the lens assembly comprises three lenses whose Abbe numbers are greater than 50.

17. The lens assembly according to claim 14, wherein the lens assembly satisfies one of the following conditions: (1) the lens assembly comprises at least one aspherical lens between the magnification side and the aperture; (2) the lens assembly comprises the cemented lens between the reduction side and the aperture, and the difference in the radius of curvature between two adjacent surfaces of the cemented lens <0.005 mm; (3) the aperture is located between the second lens and the third lens; (4) the aperture is located between the third lens and the fourth lens; (5) the second lens, the third lens, the fourth lens and the fifth lens are all formed of plastics.

18. The lens assembly according to claim 14, wherein the lens assembly satisfies one of the following conditions: (1) LT is less than 14.5 mm; (2) TTL is less than 16.5 mm.

19. The lens assembly according to claim 14, wherein the lens assembly satisfies one of the following conditions: (1) the lenses arranged from the image magnification side to the image reduction side sequentially are: convex-concave lens, aspherical lens, aspherical lens, aspherical lens and aspherical lens; (2) the refractive powers of the lenses arranged from the image magnification side to the image reduction side, sequentially are negative, negative, positive, negative, positive.

20. The lens assembly according to claim 14, wherein the lens assembly satisfies one of the following conditions: (1) BFL/TTL <0.2; (2) |f/f45|<0.3; (3) CRA <18°; (4) Dist <−67%.

* * * * *